MAGNETIC CONTROL CIRCUITS

Filed Aug. 18, 1959 2 Sheets-Sheet 1

INVENTORS T. H. CROWLEY
U. F. GIANOLA
BY William H. Kamstra
ATTORNEY

March 24, 1964 T. H. CROWLEY ET AL 3,126,531

MAGNETIC CONTROL CIRCUITS

Filed Aug. 18, 1959 2 Sheets-Sheet 2

INVENTORS T. H. CROWLEY
U. F. GIANOLA

BY William H. Kaustra

ATTORNEY

United States Patent Office 3,126,531
Patented Mar. 24, 1964

3,126,531
MAGNETIC CONTROL CIRCUITS

Thomas H. Crowley, Madison, and Umberto F. Gianola, Florham Park, N.J., assignors to Bell Telephone Laboratories, Incorporated, New York, N.Y., a corporation of New York Filed Aug. 18, 1959, Ser. No. 834,587
12 Claims. (Cl. 340—174)

Figure 1:
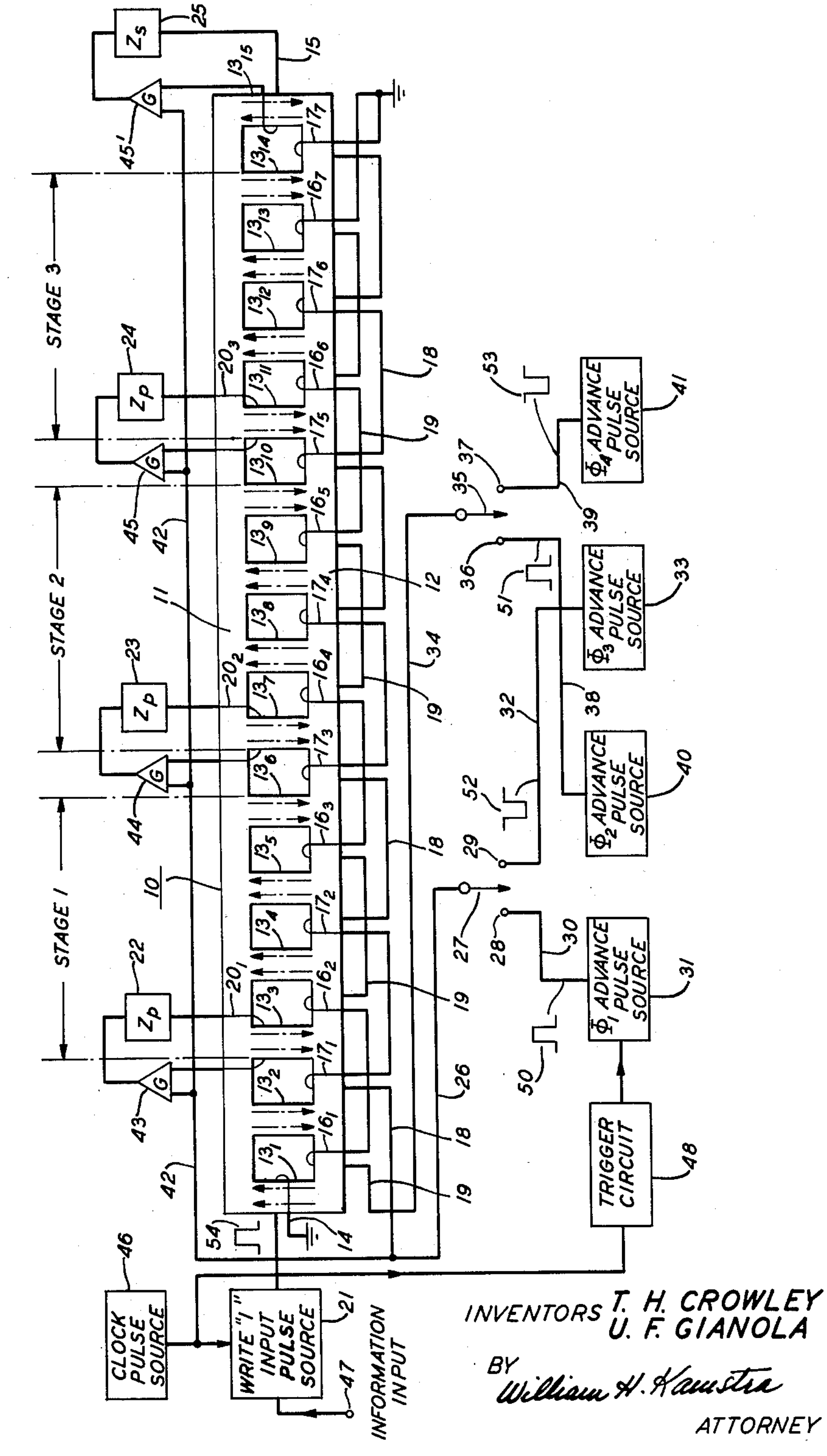

This invention relates to electrical control circuits and particularly to shift registers or delay lines in which two-state magnetic elements are employed as temporary information storage cells.

Shift registers, or delay lines as they are frequently termed, in which conventional toroidal magnetic cores are employed as temporary information storage elements, are well known in the electrical information handling art. In such registers, an information bit is introduced in a first stage of a serial train of stages, each stage comprising one or more of the toroidal cores, and is shifted along successive stages of the register during alternating advance phases of operation. An information bit is temporarily stored between advance shifts in the toroidal core or cores of a stage of the register in the form of a particular condition of remanent magnetization and is shifted between temporary storage cores of the register via coupling circuits coupling adjacent cores of the stages. Each of the stages thus comprises individual discrete storage elements in which flux changes independent of flux changes in other and adjacent elements are effective to accomplish the introduction and transfer of information bits from stage to stage. As an information bit is shifted along the register, its character may be examined at any stage during a shift by coupling an output winding either on each of the cores or an a core of a stage at which an information bit is to be read. In addition to the foregoing parallel read-out, it is also known, and it is generally the practice, to provide an output winding on the last core of the serial train to make possible serial read-out when an information bit ultimately is shifted to the end of the register.

Although the application of the well-known toroidal magnetic cores to realize various and numerous information handling circuits has proven highly advantageous, it may be noted that in some respects, problems peculiar to their use have also been introduced. Particularly this is true in connection with shift register circuits. Thus, owing to the serial construction of such register circuits, any break in the continuity of the register train may result in the complete failure in the transmission of an information sequence or in the transmission of spurious information signals. Further, because of the manner in which an information bit is introduced in a core storage element, or transferred therefrom, additional and expensive associated electrical circuit elements are generally necessitated. An information bit is transferred from a core in which it is stored by switching the magnetic remanent state of the core from one polarity to the other to induce an output voltage in an output winding coupled to the core. A coupling circuit including the output winding and an input winding of the transferee core, as a result, has a current caused therein which in turn switches or sets the magnetic state of the transferee core to that representative of the transferred information bit. Thus, each core storage element must be coupled to its preceding and succeeding element by windings and connecting wiring in order to achieve the required shift of information in a conventional register. Further, in order to insure only a unilateral propagation of information bits in the register at one time, diodes are generally required to isolate each stage of the register from its preceding stage. The necessity of providing coupling circuitry and, in many cases, isolating diodes, not only adds to the cost of the register but also constitutes a serious problem from the viewpoint of substantial power losses.

The employment of separate toroidal magnetic cores and the like to serve as individual information bit storage elements demands a high degree of uniformity in the characteristics of the cores selected for fabrication of a shift register circuit. Further, since each core must be individually handled in the fabrication process, the cores are subject to damage and defects which may not readily be detected until after the circuit has been completely wired. The aforementioned continuity required in shift register circuits thus imposes a rather rigorous burden on the selection of the cores and the care in handling them during fabrication.

It is an object of the present invention to provide a new and novel shift register circuit in which the propagation of information is accomplished entirely within the confines of a single integral magnetic structure.

It is also an object of this invention to provide a new and novel magnetic shift register circuit in which the propagation of information is accomplished between magnetic storage elements without the use of intermediate electrical coupling circuitry.

Another object of this invention is the unilateral propagation of information between the stages of a shift register circuit without the necessity of providing unilateral current conducting elements for this purpose.

Still another object of this invention is to provide a simple, more reliable shift register circuit and one more easily fabricated than has hitherto been generally possible.

A further object of this invention is the propagation in successive steps along a magnetic structure of a particular magnetic flux distribution pattern.

The foregoing and other objects of this invention are realized in a specific illustrative embodiment thereof having for its information storing and transfer medium a ladder-like magnetic structure. The structure, which is advantageously of a material capable of assuming stable remanent states, is integrally formed to present a pair of parallel side rails having a plurality of transverse rungs or legs therebetween. Such a structure is also employed in other novel circuit contexts described in the copending application of the present inventors Serial No. 732,549, filed May 2, 1958, now Patent No. 2,963,591, issued December 6, 1960.

In accordance with the principles of the present invention, a predetermined flux distribution pattern is introduced partially formed via an input winding coupled to a first leg of the structure, which pattern when fully developed, is held representative of a particular binary value. The particular pattern achieves its complete information representative configuration during successive advance phases of operation. The information value so represented is shifted along successive "stages" of the register by alternating sequences of advance pulses. At any selected point along the magnetic structure, the information value may be interrogated by sensing windings coupled to the structure at that point. Parallel read-out is thus advantageously made available. When the flux distribution pattern reaches the last leg of the magnetic structure, serial read-out is also made available by coupling a serial read-out winding to the latter leg.

It is an important feature of this invention that the flux distribution pattern referred to hereinbefore is shifted along the shift register entirely within the magnetic structure by successively reversing the direction of flux closures around the apertures therein formed by the side rails and transverse legs.

It is also a feature of this invention that an advance winding is coupled to the magnetic structure through each aperture formed by the side rails and transverse legs, which advance windings are connected in a plurality of alternately energized advance circuits to accomplish the successive shifting of the information representative flux distribution pattern.

It is a further feature of this invention that positive flux control is maintained in the magnetic structure to effect the propagation of the flux pattern along the structure by maintaining the minimum cross-sectional areas of the portions of the structure defining closed flux loops substantially equal.

It will be appreciated from the foregoing general description that a compact, unitary shift register device is thus realized, all of the circuit elements of which are maintained in a substantially rigid association by the single magnetic flux switching structure. The necessity for providing interelement electrical coupling loops and diodes is thus completely obviated and problems of handling and mounting are thus to a large extent avoided. A related circuit arrangement achieving similar advantages but operating in a different manner is described in the copending application of U. F. Gianola, Serial No. 834, 464, filed August 18, 1959.

This invention together with the foregoing and other objects and features thereof will be better understood from a consideration of the detailed description of an illustrative embodiment thereof which follows when taken in conjunction with the accompanying drawing in which:

FIG. 1 is a schematic presentation of an illustrative embodiment in which the associated external circuits are shown in block diagram form; and FIGS. 2*a*, 2*b*, 2*c*, 2*d*, and 2*e* depict an illustrative flux distribution pattern representative of a binary value in various stages of its development. The patterns are shown in connection with partial views of the magnetic structure shown in FIG. 1.

The unitary magnetic structure contemplated as comprising the basic information storage and transfer medium of this invention is shown most clearly in FIG. 1. The magnetic structure 10 is formed from a material exhibiting substantially rectangular hysteresis characteristics to present a pair of side rails 11 and 12 having a plurality of transverse rungs or legs 13 disposed therebetween. As will more clearly appear hereinafter, to achieve a positive control over the propagation of a flux distribution pattern in the structure 10, the minimum cross-sectional areas of the legs 13, and preferably of the side rails 11 and 12, are maintained substantially equal. A magnetic structure in which each of the possible flux closure paths is flux-limited to the same flux magnitude is thus realized. In the specific embodiment being described, fifteen such legs $13_1$ through $13_{15}$ are shown. The first leg $13_1$ has inductively coupled thereto an input winding 14 and the last leg or serial output leg $13_{15}$ has inductively coupled thereto a serial output winding 15. Inductively coupled through the apertures of the structure 10 formed by the side rails 11 and 12 and legs 13 are advance windings 16 and 17. The advance windings 16 and 17 are advantageously but not necessarily thus coupled to the side rail 12. Advance windings $16_1$ through $16_7$ are coupled through the first and last aperture of the structure 10 and each alternating aperture therebetween in alternating senses. Advance windings $17_1$ through $17_7$ are coupled through the remaining alternating apertures of the structure 10 also in alternating senses. The advance windings 17 are serially connected in a first advance circuit 18 energized in a first and third advance phase of operation, $\Phi_1$ and $\Phi_3$ and the advance windings 16 are serially connected in a second advance circuit 19 energized in a second and fourth advance phase of operation, $\Phi_2$ and $\Phi_4$. In the present embodiment, parallel output windings $20_1$, $20_2$, and $20_3$ are inductively coupled to the legs $13_3$, $13_7$, and $13_{11}$, respectively.

Each of the windings 14 and 15, and each of the advance circuits 18 and 19 is connected at one end to ground. The input winding 14 is connected at its other end to a write "1" input pulse source 21. The other end of the serial output winding 15 and one end of each of the parallel output windings 20 is connected to a utilization or load circuit Z. Specifically, the parallel output windings $20_1$, $20_2$, and $20_3$, are connected to $Z_p$ load circuits 22, 23, and 24, respectively, and the serial output winding 15 is connected to a $Z_s$ load circuit 25. The other end of the advance circuit 18 is connected via a conductor 26 to a wiper 27 of a two-position switch having contacts 28 and 29. The contact 28 has connected thereto via a conductor 30 a $\Phi_1$ advance pulse source 31. The contact 29 has connected thereto via a conductor 32 a $\Phi_3$ advance pulse source 33. The other end of the advance circuit 19 is connected via a conductor 34 to a wiper 35 of a second two-position switch having contacts 36 and 37. The contacts 36 and 37 have connected thereto, respectively, via conductors 38 and 39, $\Phi_2$ and $\Phi_4$ advance pulse sources 40 and 41. The advance circuit 18 is also connected at its other end via a common conductor 42 to one of the inputs of each of the two-input AND gates 43, 44, 45, and 45'. The other ends of the parallel output windings $20_1$, $20_2$, and $20_3$ are connected to other inputs respectively, of the two-input AND gates 43, 44, and 45. The single outputs of each of the latter gates are serially connected to the $Z_p$ loads 22, 23, and 24 and complete the parallel output winding-load circuits.

Timing control of the shift register circuit thus far described may be accomplished in any manner dictated by the requirements of the system of which the present invention may be adapted for use. An exemplary such arrangement may conveniently be devised as shown in FIG. 1. Thus, basic timing control may be provided by periodic timing pulses supplied by a clock pulse source 46 to determine the operation of the input pulse source 21. The latter circuit is also controlled by information instruction signals applied to the input terminal 47 from external associated circuitry, not shown. The periodic pulses from the clock pulse source 46 may also be employed to determine the timing of the $\Phi_1$ advance pulse source 31 in order to insure the introduction of information values only just prior to the $\Phi_1$ advance phase for reasons to be described hereinafter. To further insure proper intervals between the introduction of an information value of $\Phi_1$ advance phase of operation, a trigger circuit may be interposed between these circuit components.

The associated load circuits, pulse sources, gates, and the like, which comprise auxiliary elements of the present invention are shown only in block diagram form. Each of these circuits comprises arrangements well known in the art or readily devisable by one skilled in the art and accordingly need not be described in detail to provide a full and complete understanding of the present invention. The pulse sources for providing particular operating current pulses will be further described only to the extent that hte polarity and magnitude, where the latter is specially limited, are specified. In this connection, it may also be noted that, although a mechanical switching arrangement is shown for the wipers 27 and 35, it is to be understood that any suitable means of an electronic or other character may as well be employed.

The organization of this invention and the manner of its practice may be further understood from a description of an illustrative cycle of operation. For this purpose, it will be assumed that an initial normal flux distribution is present in the structure 10 as represented by the broken lines in the legs 13. Each of the lines is taken to represent one half of the total flux value which can be induced in a particular leg 13 and the arrows indicate the polarity of the flux present. Since each of the legs 13 is flux-limited to the same degree in view of the equal cross-sectional areas, the flux magnitude represented by broken flux-lines is thus consistent in each case. The initial flux distribution assumed then is one in which a remanent flux is present in the structure 10 in closed loops through adjacent pairs of the legs 13. In accordance with the theoretic flux behavior to be assumed in describing the operation of this invention, oppositely directed lines within a single leg 13, where they may occur hereinafter, may be regarded either as magnetically neutral or as containing oppositely poled fluxes which find closure by linking with other such fluxes in other legs. In either case the operation of this invention may be satisfactorily explained. Thus, the last leg $13_{15}$ has no normal flux closed therethrough the leg being in a magnetically neutral condition. Accordingly, this flux condition is represented by two oppositely directed arrows in leg $13_{15}$. The precise physical behavior of the magnetic domains within the structure 10 during flux switching and redistribution is considerably more complex; such a more detailed description lies outside of the scope of this invention however and is unnecessary for a complete understanding thereof. Closure of the flux in each of the legs 13 may readily be traced through the side rails 11 and 12.

In accordance with the practice in connection with the representation of binary values in conventional shift register circuits generally, the particular polarization state associated with a clear condition of a stage will also be representative of a binary "0". A "1" binary information bit is thus represented by a change in the magnetic flux distribution in a stage from its normal pattern. The first operation which may be described is one in which the register is clear or contains all binary "0's" in its stages. Prior to the $\Phi_1$ advance phase no instruction signal has accordingly been applied to the terminal 47 and the input pulse source has not been energized. A $\Phi_1$ advance phase is initiated by moving the wiper 27 to the contact 28 to prepare a path from the advance pulse source 31 to the advance circuit 18. When a trigger pulse from the trigger circuit 48 is generated responsive to a periodic clock pulse from the source 46, the $\Phi_1$ advance pulse source 31 is energized. The latter circuit produces a positive current pulse 50 which is applied via the conductors 30 and 26 and advance circuit 18 to each of the advance windings $17_1$ through $17_7$. The latter windings are coupled to the structure 10 in alternating senses such that magnetomotive forces are developed which tend in some cases to induce switching fluxes about the apertures through which the advance windings 17 are coupled. The positive current pulse 50, however, is so regulated in magnitude with respect to the number of turns of each of the windings 17 that the magnetomotive forces developed in each case are only of sufficient magnitude to casue a complete flux switching about single apertures. That is, the current pulse 50 is limited so that it can cause a flux switching only between adjacent legs 13 of the structure 10. This limitation on the applied drive together with the further limitation that all of the equally flux-limited closure paths for a switching flux are already saturated, precludes any change in the initial flux distribution as the result of the $\Phi_1$ advance pulse 50 applied at this time. This may be specifically demonstrated by describing the effect of the applied advance pulse 50 on the portion of the structure 10 controlled by the advance winding $17_1$, for example. The magnetomotive force developed in this case is such as to tend to switch the flux in the leg $13_3$, which switching is possible if a flux linking or closure path for the induced switching flux is available through the adjacent leg $13_2$ in accordance with the limitation on the magnetomoitve force described above. The flux in the leg $13_2$ is in the proper direction for such linkage with the switching flux in the leg $13_3$. However, the flux in the leg $13_2$, in the flux distribution assumed, presently closes through the leg $13_1$ and a reversal of at least part of the flux in the latter leg would be necessary to accomplish any flux switching in the driven leg $13_3$ presently being considered. The latter flux switching would, however, violate the condition imposed that the drive being applied via the advance winding $17_1$ is only of a magnitude sufficient to cause a flux reversal between a single pair of adjacent legs 13. Closure of switching flux in the structure 10 in the forward direction is similarly denied; in addition, the simultaneous demands for closure paths by switching flux being induced by the advance current pulse 50 in the advance windings $17_2$ through $17_7$ also prevent any effective flux reversals at this time.

The $\Phi_2$ advance phase is initiated by restoring the wiper 27 to a normal position and controlling the wiper 35 to the contact 36 position thereby preparing a path for the $\Phi_2$ advance pulse source 40 to the advance circuit 19 via the conductors 38 and 34. The source 40 may be energized under the basic control of the periodic pulses from the clock pulse source 46, also by trigger means, not shown in the drawing. However, the only requirement for the timing of the $\Phi_2$, $\Phi_3$, and $\Phi_4$ advance phases is that they occur after the $\Phi_1$ advance phase and, of course, before the re-energization of the $\Phi_1$ advance pulse source 31 by a clock controlled trigger pulse from the trigger circuit 48. When energized, the $\Phi_2$ advance pulse source 40 generates another positive current pulse 51 also having a limited magnitude with respect to the number of turns of the advance windings 16 to which it is applied. However, as an inspection of the flux distribution in the structure 10 and the alternating senses of the windings 26 in FIG. 1, will reveal flux reversals are now fully possible in each of the legs 13. In each case both the limitation of the drives applied and the limited availability of switching flux closure paths permit a complete flux switching in each of the legs 13. The latter flux switching, as a result, occurs and the flux distribution pattern after the $\Phi_2$ advance phase is changed to the extent that the polarity of the flux in each of the legs 13, except the last leg $13_{15}$, is reversed from that depicted in FIG. 1. The neutral condition of the latter leg remains undisturbed at this time.

With the restoration of the wiper 35 to a normal position after the completion of the $\Phi_2$ advance phase, the wiper 27 is now controlled to contact the contact 29 to initiate the $\Phi_3$ advance phase of operation. The latter contact prepares a path from the $\Phi_3$ advance pulse source 33 to the advance circuit 18 via the conductors 32 and 26. When the advance pulse source 33 is energized, which may be accomplished under the timing control of associated external circuitry also not shown, a negative current pulse 52 is generated and applied to the advance windings 17 of the advance circuit 18. The negative current pulse 52 is also limited in magnitude with respect to the number of turns of the advance windings 17 so that the magnetomotive forces developed are each sufficient only to reverse the flux about two adjacent legs 13. As was demonstrated in connection with the limited positive pulse 50 applied to the advance windings 17 during the $\Phi_1$ advance phase, again no effective flux reversals can take place at this time. Since no flux reversals were possible in the initial flux distribution pattern as a result of the positive advance pulse applied during the $\Phi_1$ advance phase, it follows that no flux reversals are possible in a reversed flux distribution pattern as a result of the negative advance pulse applied during the $\Phi_3$ advance phase. Since no binary "1's" have been introduced or are contained in the register no significant flux changes have occurred, however, which would be of interest to associated sensing or load circuitry during the $\Phi_3$ advance phase.

The wiper 27 is again restored to a normal position and the wiper 35 controlled to contact the contact 37 to initiate the last advance phase, $\Phi_4$, of a complete advance cycle of operation of this invention. A path is thus prepared from the $\phi_4$ advance pulse source 41 to the advance circuit 19 via the conductors 39 and 34. When the advance pulse source 41 is energized, a negative current pulse 53 is generated and thereupon applied to the advance windings 16 of the advance circuit 19. The negative current pulse 53 is also limited in magnitude with respect to the number of turns of the advance windings 16 in the manner and to the extent of each of the current pulses 50, 51, and 52, previously described. At this time again, the magnetomotive forces developed by the current pulse 53 and the availability of switching flux closure paths are such that a reversal of flux can take place in each of the legs 13, again with the exception of the neutral last leg $13_{15}$. When this occurs the flux distribution pattern is restored to that initially assumed and as represented in FIG. 1 of the drawing.

To recapitulate, a complete advance cycle of operation in a shift register according to the principles of this invention in which each of the stages is clear or in which each stage contains a binary "0," leaves the magnetic structure 10 in the same magnetic flux distribution state as that obtaining before the advance cycle was initiated. Thus, during the $\Phi_1$ advance phase no flux switching takes place, during the $\Phi_2$ advance phase a complete flux switching in each of the legs 13 except the leg $13_{15}$ takes place, during the $\Phi_3$ advance phase no flux switching takes place, and during the $\Phi_4$ advance phase a complete flux switching in each of the legs 13 in the opposite direction, except in the leg $13_{15}$, takes place to restore the initial flux distribution.

From the foregoing recapitulation of the flux behavior in the structure 10 particularly in view of the flux reversals occurring during the $\Phi_2$ and $\Phi_4$ phases during an advance cycle, it is clear that output signals may be obtained even when the register is clear or contains all binary "0's." In conformity with conventional shift register circuit practice generally, it becomes desirous to avoid any ambiguity in the output conditions representative of the two binary values. This is readily arranged in conventional toroidal core circuits when the failure of an advance pulse to cause flux switching results in the induction of only a negligible noise signal, which noise signal may be held indicative of a binary "0." When a flux reversal is caused, a full-valued output signal is induced which then may be understood as representative of a binary "1" to achieve the desired discrimination between output signals. The same discrimination is readily achieved in accordance with the present invention by selecting as an output phase one of the advance phases during which no flux switching takes place in a stage which is clear or contains a binary "0" during the application of the advance drive. Thus, either the $\Phi_1$ and the $\Phi_3$ advance phase may be selected for this purpose since, as was described in the foregoing, no flux switching takes place under "0" information states during those advance phases. As a result, no output signals or at least only negligible noise signals will be induced in the parallel output windings 20 and serial output winding 15 during a $\Phi_1$ or $\Phi_3$ advance phase. However, since incidental flux switching without information significance does occur during the $\Phi_2$ and $\Phi_4$ advance phases, provision is made against the generating of spurious output signals produced at these times. Thus, to provide for the energization of the loads $Z_p$ and load $Z_s$ only at times when a binary "1" is in fact being shifted, the output signals to these loads are grated to occur, if at all, only during the selected $\Phi_1$ advance phase. The AND gates 43, 44 45, and 45' are connected at their input sides, respectively, to the output windings $20_1$, $20_2$, $20_3$, and 15 and also to the advance circuit 18 energized in the $\Phi_1$ and $\Phi_3$ advance phases. Selection between the latter phases is readily accomplished by suitable poling of the AND gates, which may advantageously comprise well-known diode arrangements, to respond only to the coincidence of the positive advance current pulse 50 occurring during the $\Phi_1$ advance phase and the output signals induced in the output winding 20 and 15 at that time. An exemplary generation of output signals representative of binary "1" information values from the shift register circuit of FIG. 1 will now be described in the following.

The basic advance operations having been described in the foregoing, the introduction of an illustrative "1" binary information value may now be described. A "1" information instruction signal is applied from external circuitry, not shown, of the system of which the present invention may comprise a part, to the information input terminal 47 of the input pulse source 21. As a result, at a time determined by a clock pulse from the clock pulse source 46, the source 21 is energized to apply a positive input current pulse 54 to the input winding 14. The pulse 54 need not be limited in magnitude as were the pulses described in connection with the advance phases of operation. The magnetomotive force developed by the input pulse 54, representative of a binary "1" being introduced, switches the flux initially closed in one direction around the loop partially defined by the legs $13_1$ and $13_2$. The resulting flux distribution pattern in the affected portion of the magnetic structure 10 is depicted to FIG. 2*a* where complete flux closures are shown to facilitate one manner of understanding the flux behavior during the present operation. The first stage in the development of a "1" bit flux pattern has thus been completed.

Figure 2A:
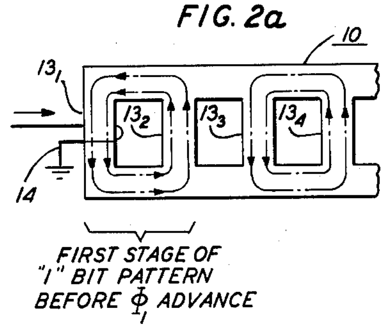
Figure 2B:
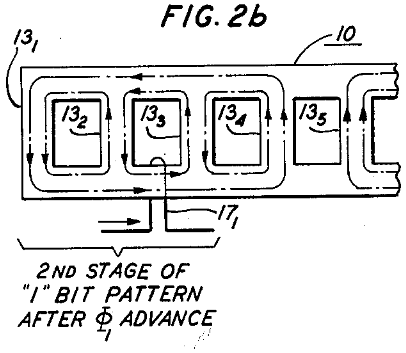

After the first stage of the "1" bit pattern has been completed and at a time as determined by the trigger circuit 48, the $\Phi_1$ advance pulse source is energized in the first phase of an advance cycle of operation. The limited magnitude advance pulse 50 applied, as a result, to the advance winding $17_1$ in the manner previously described, is now enabled to cause a flux switching between the legs $13_2$ and $13_3$ to which it is coupled. This is now possible since the latter flux switching will require no additional flux switching in more remote legs to find closure paths. The resulting change in the flux distribution pattern of the affected portion of the structure 10 is shown in FIG. 2*b*. It is to be noted that only partial switching of the total flux in the legs $13_2$ and $13_3$ occurs and the resulting magnetic state of the latter legs may consistently be understood as being magnetically neutral. Flux closures again have been chosen and depicted in a manner to provide a consistent explanation of the various flux changes occurring. The particular flux pattern to be ultimately representative of a binary "1" is marked off in its second developmental stage in FIG. 2*b*. In accordance with the limited flux paths available and the limited magnitude of the advance current pulse 50, no flux switching occurs in the remainder of the structure 10 for the reasons previously explained.

At this point, it may be recalled that the $\Phi_1$ advance phase was also selected as an output phase. Since a flux switching does occur during the present operation indicative of the presence in the register of a binary "1," an output signal is induced in the parallel output winding $20_1$ coupled to the leg $13_3$. This output signal, occurring as it does during the application of the advance current 50 applied via the conductor 42 to the gate 43, enables the latter element and the output signal representative of the binary "1" is transmitted to the interested parallel load 22. Since the gates 43, 44, 45, and 45' are enabled only during the $\Phi_1$ advance phase, no further mention will be made of the parallel or serial outputs during the subsequent other advance phases of the present advance cycle.

Figure 2C:
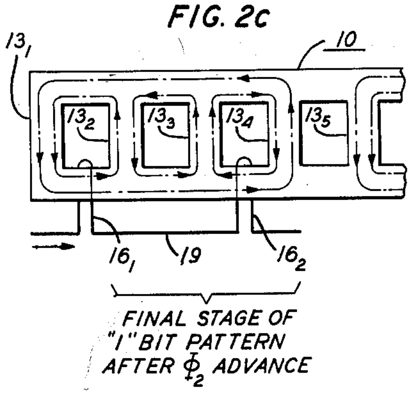
Figure 2D:
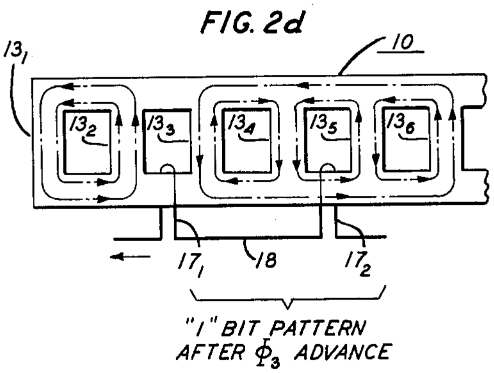
Figure 2E:
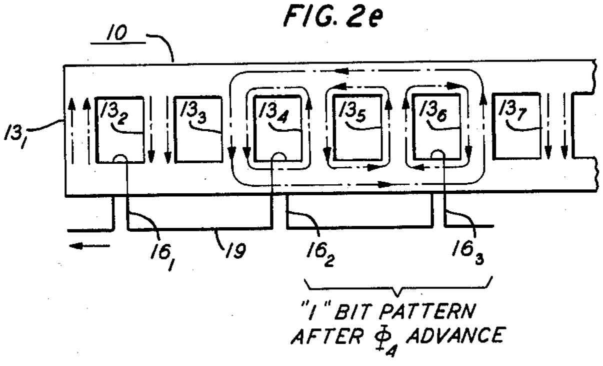

During the $\Phi_2$ advance phase, it will be recalled, a complete switching of flux in the legs 13 was possible and did occur in those portions of the structure 10 which were in a clear state or contained binary "0's". This same flux switching will occur in the legs $13_5$ through $13_{14}$ and a description of the flux behavior in these legs in this connection need not be repeated at this point. The introduction of a binary "1" and its shift along the register at this stage will be described with particular regard to the specific advance windings $16_1$ and $16_2$ of the advance windings energized in the $\Phi_2$ advance phase. The effect of the application of the advance current pulse 51 applied to the latter windings during the $\Phi_2$ advance phase may best be described with reference to the flux distribution patterns shown in FIGS. 2*b* and 2*c*. Bearing in mind the limitation on both the magnitude of the drive and the available closure paths, the magnetomotive force developed in the advance winding $16_1$ at this time can cause no flux switching in either the coupled legs $13_1$ or $13_2$. Only one flux value in leg $13_2$ is of a direction to switch in any event; however because of the saturation of leg $13_1$ the only closure path available is through the leg $13_3$ and this path is too remote from the winding $16_1$ to be affected by the limited magnetomotive force developed therein. The magnetomotive force developed by the advance pulse 51 in the advance winding $16_2$, on the other hand, is sufficient to cause a flux switching of one of the flux values in each of the coupled legs $13_3$ and $13_4$. This flux change, depicted in FIG. 2*c*, is the only change in the "1" representative flux pattern over that depicted in FIG. 2*b* and is the final stage in the development of a complete "1" flux distribution pattern. The latter pattern is marked off in FIG. 2*c*.

It is to be noted that the now fully developed "1" flux pattern has been shifted one leg position to the right in the structure 10 as viewed in the drawing. The polarity of the remanent flux in the leg $13_1$ after the completion of the $\Phi_2$ advance phase is now what would be expected, that is, opposite to its normal direction as indicated in FIG. 1 since the polarity of flux in a clear leg is always left reversed after the $\Phi_2$ advance phase. A fully developed "1" flux distribution pattern in the present embodiment of this invention may now be generally characterized as being contained in a group of three adjacent legs 13 of the structure 10, the center leg of which group is fully remanently saturated in one direction and the two outer legs of which group are magnetically neutral.

During the next succeeding $\Phi_3$ advance phase a negative current pulse 52 is applied via the advance circuit 18 to each of the advance windings 17. As previously described in connection with an advance cycle in a clear register, no effective flux reversals take place in the portion of the structure 10 having contained therein binary "0's" or which are in a clear state. Since only a single binary "1" has been introduced and is being shifted, only the flux changes in the portions of the structure containing or which are to contain the "1" will be considered during the $\Phi_3$ advance phase. This shift of the "1" pattern may be described with reference to a comparison of FIGS. 2*c* and 2*d*. As the $\Phi_3$ negative advance pulse 52 is applied, a flux closure path is available and the magnetomotive force developed in the advance winding 17 is such that a flux switch of one flux value may be achieved in the adjacent legs $13_2$ and $13_3$. This is similarly the case in connection with the magnetomotive force developed in the advance winding $17_2$ which, as a result, causes a flux switching of one flux value between the legs $13_4$ and $13_5$. Flux closures and linkages in the flux limited paths may be understood as being completed as depicted by the broken lines in FIG. 2*d*. The "1" flux pattern has thus again been shifted one leg position to the right in the structure 10 as viewed in the drawing. The legs $13_1$ and $13_2$ are, after the completion of the $\Phi_3$ advance phase, left in a reverse clear magnetic state as is the leg $13_6$; that is, each of the latter legs is in a magnetic condition opposite to that indicated in FIG. 1, which would be expected in this case after a $\Phi_3$ advance phase during which no change in the clear magnetic state reversed during the Preceding $\Phi_2$ advance phase occurred.

When the $\Phi_4$ negative advance pulse 53 is applied to the advance windings 16 via the advance circuit 19, each of the clear legs 13 will be switched thereby reverting to their normal flux polarities as indicated in FIG. 1. Flux switching is also caused in the legs 13 containing the binary "1" but in a manner limited by the saturation fluxes already in these legs. Thus, as may be seen in FIG. 2*e*, the flux closed between the legs $13_1$ and $13_2$ is completely switched, as in the flux closed between the legs $13_7$ and $13_8$, only the former leg of which is shown. Since a part of the flux in the leg $13_3$ may be understood as already being in the direction of the applied magnetomotive force, only the other part of the flux in that leg is switched as a result of the current pulse 53 on the advance winding $16_2$. The leg $13_3$ is thus restored to its normal clear flux state and, as a further result, a part of the flux in the leg $13_4$ is also switched. The current pulse 53 on the advance winding $16_3$ causes a partial switching of flux between the legs $13_5$ and $13_6$ such as to leave the latter leg magnetically neutral. In the $\Phi_4$ advance phase the "1" flux pattern is thus again shifted one leg position to the right as viewed in the drawing. The completion of the $\Phi_4$ advance phase also constitutes the completion of one advance cycle of operation, and the flux distribution in the structure 10 is now in a state preparatory to the introduction of a second information bit which may again be a "1." If the latter is the case, the bit would again be introduced in the input stage of the register in the form of a developing "1" flux pattern, the input legs $13_1$ and $13_2$ and a succeeding leg $13_3$ being in a clear information state.

It is apparent from a consideration of the four advance cycles of operation and the particular legs in which the "1" flux pattern is found after the completion of an advance cycle, that a single storage and transfer stage of the register of FIG. 1 comprises four of the legs 13. Since the particular flux distribution pattern corresponding to a binary "1" occupies a basic information address made up of three of the legs, a four leg stage thus always provides for at least one clear buffer leg between an information bit in one stage and a bit in a preceding or succeeding stage. The illustrative shift register shown in FIG. 1 accordingly constitutes a three stage register; however, this number of stages clearly is not limiting of this invention, and it is to be understood that any number of stages may be realized by a simple extension of the structure 10 and associated wiring so far described. In order to provide for the development of the "1" bit representative flux pattern described during successive advance phases, the first stage of the illustrative register of FIG. 1 is preceded by the legs $13_1$ and $13_2$ which may be regarded as input legs of the register. The "1" bit flux pattern may thus be introduced and developed by providing only a single input winding and advantageously employing the advance windings to both contribute to the introduction of a "1" bit and to effect its shift along the register. It is to be understood, however, that by providing suitable additional input windings on initial legs 13 of the register, the "1" bit flux pattern could as well be introduced fully developed into the first stage. Such an initial simultaneous control of flux in three adjoining legs 13 may readily be accomplished by wiring devisable by one skilled in the art within the scope of this invention.

The "1" information bit, contained at this point in legs $13_4$, $13_5$, and $13_6$ of the first stage of the register, may be further shifted along by repetitive advance cycles in a manner similar to that described for its traversal through the first stage. The only difference in the succeeding advance cycles is the fact that the advance phases are not now instrumental in any further development of the "1" flux pattern. As the "1" bit pattern enters the second stage of the register and a flux change is caused in the leg $13_7$ during a $\Phi_1$ advance phase, a parallel output signal will again be gated to the $Z_p$ load 23 in the manner previously described. The latter output signal will also be indicative of the presence in the second stage of the binary "1" information value. Similarly, when the "1" bit pattern passes the leg $13_{11}$ of the third and last stage of the illustrative register of FIG. 1, a parallel output signal will be gated to the $Z_p$ load 24. Parallel output signals are thus sequentially generated as a binary "1" is successively shifted along the stages of the register. When the "1" bit flux pattern reaches the last stage of the register, a $\Phi_4$ advance phase will shift the "1" pattern to occupy the group of legs $13_{12}$, $13_{13}$, and $13_{14}$, which legs constitute the last information address of the register. Upon the next succeeding output an advance phase $\Phi_1$, during which an advance pulse 50 is applied, inter alia, to the advance windings $17_6$ and $17_7$, a flux change occurs in the output leg $13_{15}$ following the last stage of the register and at this time, as previously described, the advance pulse 50 is also employed to enable the gate 45'. The output signal generated as the result of the shifting flux pattern in the leg $13_{15}$ is now transmitted to the serial load 25 and is indicative of the fact that the binary "1" introduced earlier in the first stage of the register has completed a full traversal and is being shifted out of the register. It may be noted that although a signal has been generated during the $\Phi_1$ advance phase indicative of the fact that the binary "1" contained in the last stage is being shifted out of the register, the representative flux pattern corresponding to the "1" may not have been completely erased from the latter stage. Thus, assuming that the "1" shifted out of the register is not followed immediately by other "1" binary bits, two further advance phases are required to restore the flux legs of the last stage of the register to the normal magnetic conditions as represented by the directional arrows of FIG. 1. The last leg $13_{15}$ of the register not only provides an output leg by means of which a serial output signal may be obtained at a time consistent with the timing of the parallel output signals, but also allows an orderly erasing of the "1" bit flux pattern from the register during the advance phases of operation.

What has been described is considered to be only an illustrative embodiment of the present invention. Accordingly, it is to be understood that various and numerous other arrangements may be devised by one skilled in the art without departing from the spirit and scope of this invention.

What is claimed is:

1. An electrical circuit comprising a plurality of magnetic elements each having substantially rectangular hysteresis characteristics, an input winding inductively coupled to a first of said elements, a plurality of advance windings inductively coupled respectively to said plurality of elements, a first advance circuit means for serially connecting successive first ones of said advance windings in alternating senses, a second advance circuit means for serially connecting successive second ones of said advance windings in alternating senses, said first ones of said advance windings alternating with said second ones of said advance windings, magnetic means for completing flux paths between each of said elements and its adjacent elements, means including an input pulse source for applying an input pulse to said input winding for inducing a particular flux pattern in adjacent first ones of said plurality of elements, and means for shifting said flux pattern along said plurality of elements comprising means for alternately applying first advance pulses of one and the opposite polarity to said first advance circuit means, and means for alternately applying second advance pulses of one and the opposite polarity to said second advance circuit means alternately with said first advance pulses applied to said first advance circuit means.

2. An electrical circuit as claimed in claim 1 also comprising output windings inductively coupled to particular ones of said plurality of elements energized responsive to flux changes in said last-mentioned elements for generating output signals.

3. An electrical circuit comprising a plurality of magnetic elements each having substantially rectangular hysteresis characteristics, input means including an input winding inductively coupled to a first of said elements, a plurality of advance windings inductively coupled respectively to said plurality of elements, a first advance circuit for serially connecting successive first ones of said advance winding in alternating senses, a second advance circuit for serially connecting successive second ones of said advance windings in alternating senses, said first ones of said advance windings alternating with said second ones of said advance windings, magnetic means for completing flux paths bewteen each of said elements and its adjacent elements, means for energizing said input means to induce a particular flux distribution pattern in adjacent first ones of said plurality of elements, and means for shifting said flux distribution pattern along said plurality of elements comprising means for applying a first advance pulse of one polarity to said first advance circuit in a first advance phase, means for subsequently applying a second advance pulse of said one polarity to said second advance circuit in a second advance phase, means for subsequently applying a third advance pulse of the opposite polarity to said first advance circuit in a third advance phase, and means for subsequently applying a fourth advance pulse of said opposite polarity to said second advance circuit in a fourth advance phase.

4. An electrical circuit as claimed in claim 3 also comprising a parallel output winding inductively coupled to a particular one of said elements energized responsive to flux changes in said last-mentioned element for generating a parallel output signal, a first gating means having one input connected to said parallel output winding and another input connected to said first advance circuit, and a parallel load means connected to an output of said first gating means, said gating means being enabled responsive to the coincidence of a parallel output signal in said parallel output winding of a particular polarity and one of said first and third advance pulses of said particular polarity applied to said first advance circuit.

5. An electrical circuit as claimed in claim 4 also comprising a serial output winding inductively coupled to a last of said plurality of elements energized responsive to flux changes in said last-mentioned element for generating a serial output signal, a second gating means having one input thereof connected to said serial output winding and another input thereof also connected to said first advance circuit, and a serial load means connected to an output of said second gating means, said second gating means also being enabled responsive to the coincidence of a serial output signal in said serial output winding of said particular polarity and said one of said first and third advance pulses of said particular polarity applied to said first advance circuit.

6. An electrical control circuit comprising a magnetic structure having substantially rectangular hysteresis characteristics, said structure comprising a pair of side rails having a plurality of transverse legs therebetween, said plurality of legs and said side rails defining a plurality of adjacent closed flux paths, an input winding inductively coupled to a first leg of said structure, a plurality of advance windings inductively coupled respectively to said plurality of closed flux paths, a first advance circuit means for serially connecting successive first ones of said advance winding in alternating senses, a second advance circuit means for serially connecting successive second ones of said advance windings in alternating senses, said first ones of said advance windings alternating with said second ones of said advance windings, means for applying an input pulse to said input winding to induce a switching flux in the first closed flux path of said structure, and means for successively inducing a switching flux in succeeding ones of said closed flux paths comprising means for alternately applying first advance pulses of one and the opposite polarity to said first advance circuit means, and means for alternately applying second advance pulses of said one and said opposite polarity to said second advance circuit means alternately with said first advance pulses applied to said first advance circuit means.

7. An electrical control circuit as claimed in claim 6 also comprising a plurality of output windings inductively coupled respectively to selected ones of said legs energized responsive to flux changes in said last-mentioned legs for generating output signals.

8. An electrical control circuit as claimed in claim 7 also comprising a load means associated with each of said output windings, and a plurality of gating means having outputs connected respectively to said load means and inputs connected respectively to said output windings, each of said gating means also having an input connected to one end of said first advance circuit means, each of said gating means being enabled when the polarity of said output signals corresponds to the polarity of a particular first advance pulse being applied to said first advance circuit means.

9. An electrical control circuit as claimed in claim 7 in which each of said transverse legs has a minimum cross-sectional area substantially equal to the minimum cross-sectional area of each of the others of said transverse legs and each of said first and said second advance pulses being of a magnitude sufficient to induce said switching flux only between adjacent ones of said transverse legs.

10. An electrical control circuit comprising a magnetic structure having substantially rectangular hysteresis characteristics, said structure having a plurality of apertures therein to define a plurality of flux control legs, an input winding coupled through a first of said apertures, a plurality of first advance windings coupled through alternating first ones of said apertures in alternating one and the opposite senses, a plurality of second advance windings coupled through alternating second ones of said apertures in alternating one and the opposite senses, means for applying an input pulse to said input winding to induce a switching flux around said first aperture, means for successively inducing a switching flux around successive ones of said apertures comprising means for alternately applying first advance pulses of one and the opposite polarity to said first advance windings, and means for alternately applying second advance pulses of one and the opposite polarity to said second advance windings alternately with said first advance pulses applied to said first advance windings; and output windings coupled through particular ones of said apertuers energized responsive to flux switching around said last-mentioned apertures for generating output signals.

11. A shift register circuit comprising a magnetic structure having substantially rectangular hysteresis characteristics, said structure defining a pair of side rails having a sequence of transverse flux legs therebetween, each of said flux legs having a minimum cross-sectional area substantially equal to the minimum cross-sectional area of each of the other legs of said sequence of flux legs, each of said legs having a normal remanent flux therein closed through an adjacent leg, an input winding inductively coupled to a first leg of said sequence of flux legs, a first plurality of advance windings inductively coupled to said structure between respective legs of alternating first pairs of said flux legs in alternating senses, a second plurality of advance windings inductively coupled to said structure between respective legs of alternating second pairs of said flux legs in alternating senses, a first advance circuit means for connecting said first plurality of advance windings in series, a second advance circuit means for connecting said second plurality of advance windings in series, means for applying an input pulse to said input winding of a magnitude sufficient to induce a switching flux between only said first and an adjacent second of said sequence of flux legs to initiate a flux distribution pattern in said structure representative of a particular information value, means for developing said flux distribution pattern and shifting said pattern along said structure comprising means for successively applying a first advance pulse of one polarity to said first advance circuit means, a second advance pulse of said one polarity to said second advance circuit means, a third advance pulse of the opposite polarity to said first advance circuit means, and a fourth advance pulse of said opposite polarity to said second advance circuit means, each of said advance pulses being of a magnitude sufficient to induce a switching flux only between adjacent ones of said flux legs; and output windings coupled to particular ones of said flux legs energized responsive to flux changes in said last-mentioned legs for generating output signals indicative of the presence of said particular information value.

12. A shift register circuit as claimed in claim 11 also comprising a plurality of gating means, each having two inputs and an output, one input of each of said gating means being connected respectively to said output windings, means for connecting the other input of each of said gating means to one end of said first advance circuit means, each of said gating means being enabled responsive to the coincidence of an advance pulse on said first advance circuit means and an output signal in the connected output winding of corresponding polarities, and a plurality of load means connected respectively to the outputs of said plurality of gating means.

References Cited in the file of this patent

UNITED STATES PATENTS

| | | |
|---|---|---|
| 2,978,682 | Green | Apr. 4, 1961 |
| 2,987,625 | Mallery | June 6, 1961 |